(12) United States Patent
Sakakibara et al.

(10) Patent No.: US 8,830,197 B2
(45) Date of Patent: Sep. 9, 2014

(54) PORTABLE ELECTRONIC DEVICE

(75) Inventors: Kenji Sakakibara, Tokyo (JP); Hiroaki Masuda, Tochigi (JP); Yu Togasaki, Kanagawa (JP); Kiyokazu Miyazawa, Kanagawa (JP); Kazuto Nakagawa, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 82 days.

(21) Appl. No.: 13/483,296

(22) Filed: May 30, 2012

(65) Prior Publication Data

US 2012/0306789 A1 Dec. 6, 2012

(30) Foreign Application Priority Data

Jun. 3, 2011 (JP) ................................. 2011-125870

(51) Int. Cl.
*H05B 33/12* (2006.01)
*G06F 3/041* (2006.01)
*G06F 1/16* (2006.01)

(52) U.S. Cl.
CPC ............ *G06F 1/1637* (2013.01); *G06F 1/1626* (2013.01)
USPC ........................................................ 345/173

(58) Field of Classification Search
CPC ............................ G09G 3/3208; G06F 3/0412
USPC .................................... 345/58, 122, 173–176
See application file for complete search history.

(56) References Cited

U.S. PATENT DOCUMENTS

| | | | |
|---|---|---|---|
| 7,505,092 B2 | 3/2009 | Ichioka | |
| 7,742,137 B2 * | 6/2010 | Adachi et al. | 349/122 |
| 8,319,709 B2 | 11/2012 | Ito | |
| 2002/0047237 A1 * | 4/2002 | Oshita | 273/148 R |
| 2006/0044490 A1 | 3/2006 | Ichioka | |
| 2007/0046874 A1 | 3/2007 | Adachi | |
| 2007/0202956 A1 | 8/2007 | Ogasawara | |
| 2010/0079698 A1 * | 4/2010 | Matsumoto et al. | 349/58 |
| 2010/0134439 A1 | 6/2010 | Ito | |
| 2010/0259503 A1 | 10/2010 | Yanase | |
| 2012/0087073 A1 | 4/2012 | Ogasawara | |

FOREIGN PATENT DOCUMENTS

| | | |
|---|---|---|
| JP | 11095192 A | 4/1999 |
| JP | 2000284702 A | 10/2000 |
| JP | 2002071940 A | 3/2002 |

(Continued)

OTHER PUBLICATIONS

Office Action for corresponding Japanese Patent Application No. 2011-125870, dated May 21, 2013.

(Continued)

*Primary Examiner* — Andrew Sasinowski
(74) *Attorney, Agent, or Firm* — Matthew B. Dernier, Esq.; Gibson & Dernier LLP

(57) ABSTRACT

An electronic device includes a front panel made of resin. The front panel is disposed on the front side of an organic electroluminescent display panel and functions as the front surface of the electronic device; and an adhesive agent layer formed between the organic electroluminescent display panel and the front panel. The organic electroluminescent display panel is fixed to the front panel via the adhesive agent layer. This structure is able to reduce a load applied to the organic electroluminescent display panel and ensure shock resistance for the organic electroluminescent display panel.

7 Claims, 3 Drawing Sheets

(56) References Cited

FOREIGN PATENT DOCUMENTS

| | | |
|---|---|---|
| JP | 2006071972 A | 3/2006 |
| JP | 2007047621 A | 2/2007 |
| JP | 2007108553 A | 4/2007 |
| JP | 2007216525 A | 8/2007 |
| JP | 3138453 U | 1/2008 |
| JP | 2009301767 A | 12/2009 |
| JP | 2010078898 A | 4/2010 |
| JP | 2010122563 A | 6/2010 |
| JP | 2010262626 A | 11/2010 |

OTHER PUBLICATIONS

Office Action for corresponding Japanese Patent Application No. 2011-125870, dated Nov. 26, 2013.

\* cited by examiner

PORTABLE ELECTRONIC DEVICE

CROSS-REFERENCE TO RELATED APPLICATION

The present application claims priority from Japanese application JP 2011-125870 filed on Jun. 3, 2011 the content of which is hereby incorporated by reference into this application.

BACKGROUND OF THE INVENTION

1. Field of the Invention

The present invention relates to a portable electronic device including an organic electroluminescent display panel.

2. Description of the Related Art

Conventionally, portable electronic devices having a liquid crystal panel as a display device have been used (e.g., U.S. Patent Application Publication 2007/0202956).

SUMMARY OF THE INVENTION

In recent years, portable electronic devices having an organic electroluminescent display panel (hereinafter referred as OLED panel) have been developed. However, since OLED panels are generally thin, compared to liquid crystal panels, reduction of load applied to the OLED panel and ensuring shock resistance are more required.

A portable electronic device according to an aspect of the present invention including: an organic electroluminescent display panel; a front panel made of resin, disposed on the front side of the organic electroluminescent display panel, and functioning as the front surface of the electronic device; and an adhesive agent layer formed between the organic electroluminescent display panel and the front panel. The organic electroluminescent display panel is fixed to the front panel via the adhesive agent layer. With this structure, since the organic electroluminescent display panel is fixed via the adhesive agent layer to the resin front panel having highly shock-resistive efficiency, the organic electroluminescent display panel, the adhesive agent layer, and the front panel together constitute a single shock-resistive component as a whole. Further, the adhesive agent layer 31 can be provided with a sufficient thickness, and thereby the adhesive agent layer can absorb the warp of the front panel. Accordingly, the load applied to the organic electroluminescent display panel can be reduced.

DETAILED DESCRIPTION OF THE INVENTION

Figure 1:
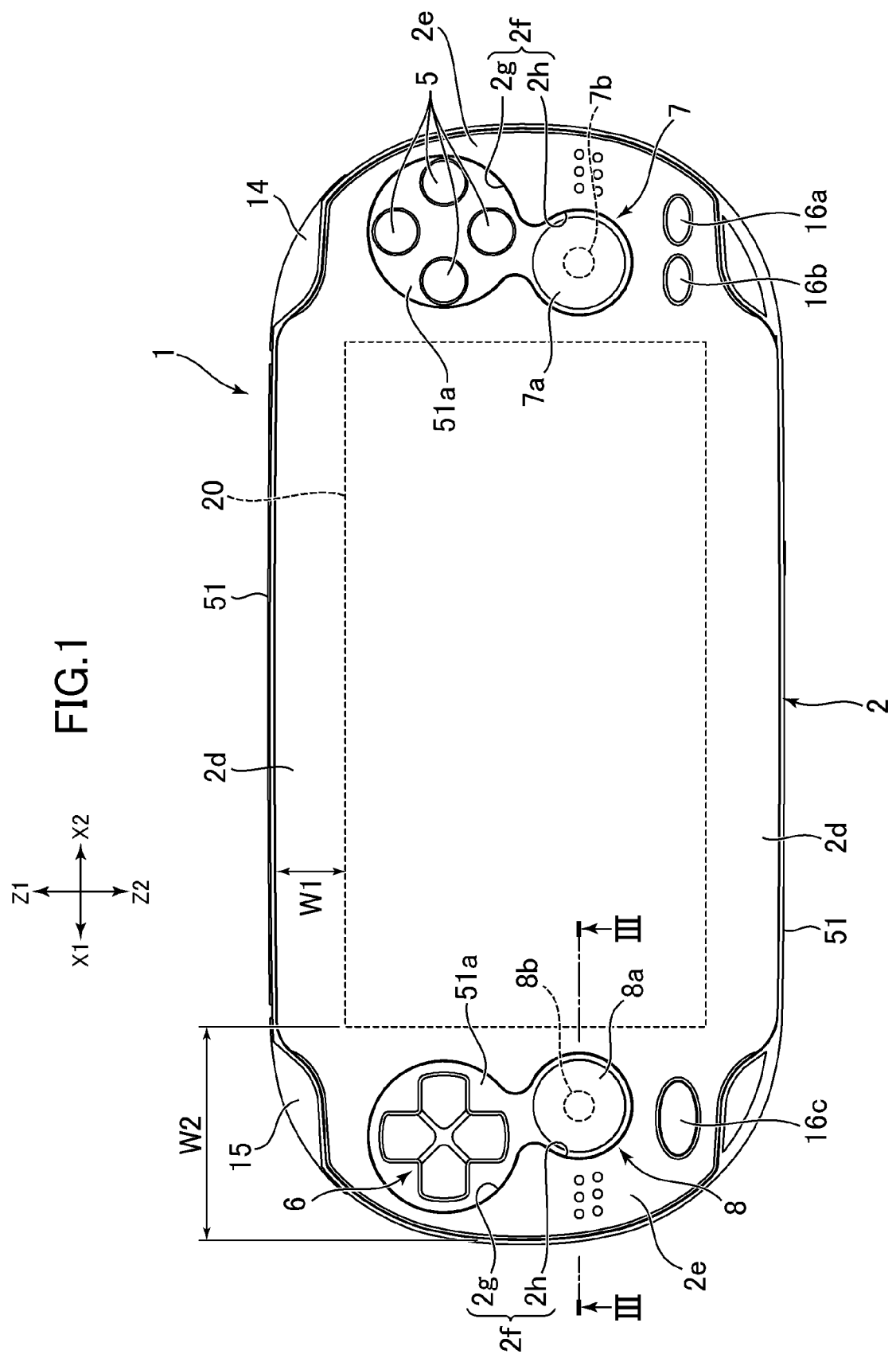
FIG. 1 is a front view of a portable electronic device according to an embodiment of the present invention.
Figure 2:
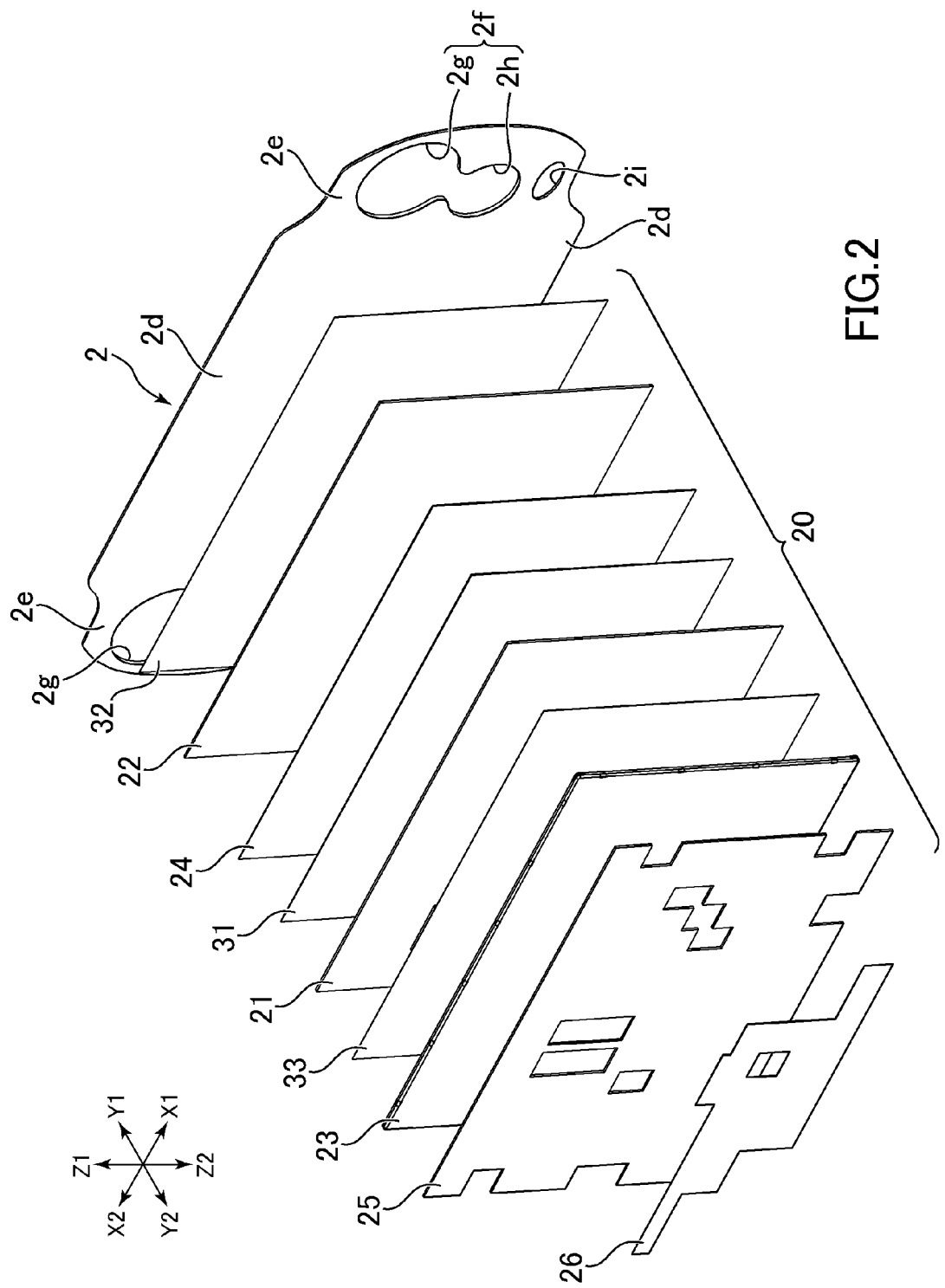
FIG. 2 is an exploded perspective view of a display panel unit of the electronic device.
Figure 3:
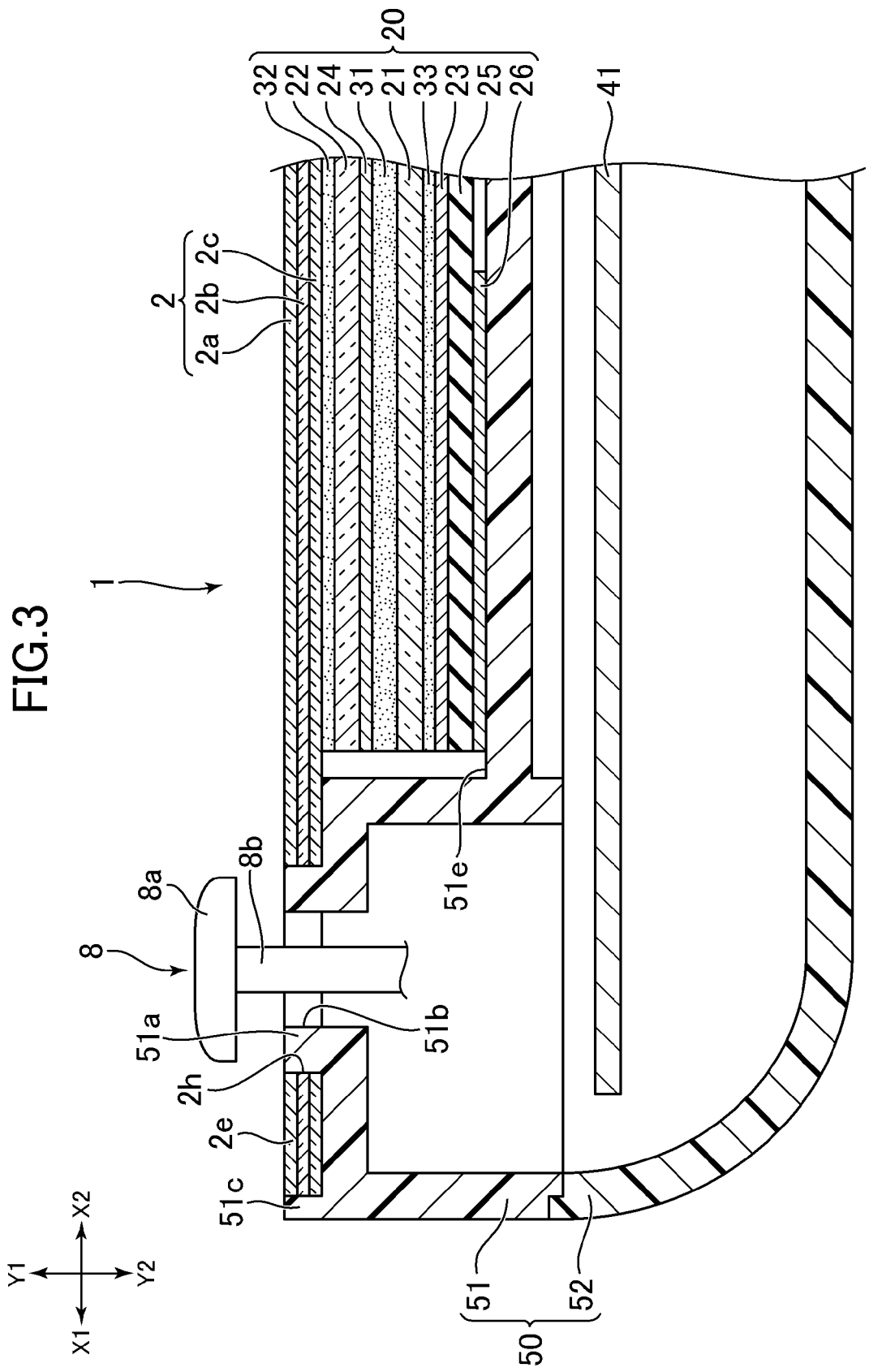
FIG. 3 is a schematic cross sectional view of the electronic device along the line III-III in FIG. 1.

Hereinafter, an embodiment of the present invention will be described with reference to the drawings. FIG. 1 is a front view of a portable electronic device 1 according to an embodiment of the present invention. FIG. 2 is an exploded perspective view of the display panel unit 20 and the front panel 2 of the electronic device 1. FIG. 3 is a schematic cross sectional view along the line III-III in FIG. 1. In the following description, X1-X2 shown in FIG. 1 corresponds to the left-right direction, Z1-Z2 corresponds to the up-down direction, and Y1-Y2 shown in FIG. 3 corresponds to the front-back direction.

As shown in FIG. 1, the electronic device 1 includes a display panel unit 20. The electronic device 1 in this example is a portable device that functions as a game device or a motion picture/sound reproduction device. The electronic device 1 has, on the front surface thereof, plural operating members to be operated by a user. Specifically, plural (four in this example) operation buttons 5 are disposed to the right of the display panel unit 20. The four buttons 5 are positioned at the respective ends of a cross shape. A directional key 6 which has substantially cross shape is disposed to the left of the display panel unit 20. Operating sticks 7, 8 are disposed to the right and left, respectively, of the display panel unit 20. The operating sticks 7, 8 include stems 7b, 8b that project forward from the electronic device 1, and operated portions 7a, 8a which have disk shape and are attached to the heads of the stems 7b, 8b, respectively. The operating sticks 7, 8 can be inclined in radial direction of the stems 7b, 8b, such as in the up-down and left-right direction, and rotated in the circumferential direction of the stems 7b, 8b at a radially inclined posture. The operating sticks 7, 8 may be slidable in the radial direction of the stems 7b, 8b. Further, the electronic device 1 has upper buttons 14, 15 provided respectively at the rightmost and leftmost positions on the top surface thereof. Still further, the electronic device 1 has buttons 16a, 16b, 16c arranged below the operating sticks 7, 8.

As shown in FIGS. 2 and 3, the display panel unit 20 includes an organic electroluminescent display panel (hereinafter referred as OLED panel) 21. The display panel unit 20 in this example further includes a touch panel 22. The touch panel 22 is, e.g., a static capacitance type. The electronic device 1 further includes a front panel 2. The front panel 2 is disposed on the front side of the OLED panel 21, that is, disposed on the front side of the display panel unit 20, and functions as the front surface of the electronic device 1. The electronic device 1 has a width in the left-right direction (the left-right width) larger than the width thereof in the up-down direction (the up-down width), as shown in FIG. 1. The front panel 2 as well has a left-right width larger than the up-down width thereof, and has a shape substantially corresponding to the outer shape of the electronic device 1 in the front view of the electronic device 1.

The front panel 2 is made of light transmissive resin, and has higher shock resistance, compared to glass. As shown in FIG. 3, the front panel 2 in this example includes a first resin layer 2a and a second resin layer 2b formed on the back surface of the first resin layer 2a. The second resin layer 2b and the first resin layer 2a are made of different materials. Specifically, the second resin layer 2b is made of material that is less hard than the first resin layer 2a. This can impart increased shock resistance to the front panel 2, while reducing the possibility of damaging the front surface of the front panel 2. In this example, the first resin layer 2a is made of acryl, while the second resin layer 2b is made of polycarbonate.

The front panel 2 further includes a third resin layer 2c formed on the back surface of the second resin layer 2b. The third resin layer 2c is made of material identical to that of the first resin layer 2a. This can reduce a warp of the front panel 2. In this example, the first resin layer 2a and the third resin layer 2c are made of acryl. These three resin layers 2a, 2b, 2c are adhered to one another with adhesive agent or the like.

As shown in FIGS. 2 and 3, the display panel unit 20 further includes an adhesive agent layer 31 formed between the OLED panel 21 and the front panel 2. The OLED panel 21 is fixed to the front panel 2 via the adhesive agent layer 31. That is, the OLED panel 21 and the front panel 2 are directly or indirectly fixed to each other via the adhesive agent layer 31. With this structure, since the OLED panel 21 is adhered to the highly shock-resistive resin front panel 2, the OLED panel 21, the adhesive agent layer 31, and the front panel 2 together constitute a single shock-resistive component as a whole. Further, the adhesive agent layer 31 can be provided with a sufficient thickness, and thereby the warp of the front panel 2 can be absorbed by the adhesive agent layer 31 and a load applied to the OLED panel 21 can be reduced.

The adhesive agent layer 31 is formed by applied adhesive agent. That is, the adhesive agent layer 31 is formed by applying adhesive agent directly to either one of the OLED panel 21 and a panel facing the OLED panel 21. The adhesive agent layer 31 is not an adhesive film including a base film (substrate) and adhesive agent applied on both surfaces of the base film. The display panel unit 20 in this example includes, between the OLED panel 21 and the touch panel 22, a wavelength panel 24 for reducing reflection of outside light. The adhesive agent layer 31 is formed by applying adhesive agent directly to either one of the front surface of the OLED panel 21 and the back surface of the wavelength panel 24. In this example, the adhesive agent layer 31 is formed by applying adhesive agent to the front surface of the OLED panel 21.

The adhesive agent layer 31 can be formed using adhesive agent having viscosity lower than that of adhesive agent applied to both surfaces of an adhesive film. For example, gel or liquid adhesive agent can be used as adhesive agent in forming the adhesive agent layer 31. The adhesive agent layer 31 is made using gel adhesive agent, such as e.g., UV curable adhesive agent. Thus, in the process of manufacturing the display panel unit 20, the OLED panel 21 and the wavelength panel 24 can be adhered to each other without application of a large pressure thereto.

Further, different from an adhesive film, the adhesive agent layer 31 does not have a substrate (that is base film). This can reduce the thickness of the adhesive agent layer 31, while a sufficient thickness necessary to absorb warp of the front panel 2 being secured in the adhesive agent layer 31. The adhesive agent layer 31 in this example is thicker than an adhesive film, to be described later, that is used to adhere the touch panel 22 and the wavelength panel 24 to the front panel 2. The adhesive agent layer 31 is formed on the front surface of the OLED panel 21. Therefore, even when a member with a warp is arranged between the OLED panel 21 and the front panel 2, the warp can be absorbed by the adhesive agent layer 31 and thus application of a load to the OLED panel 21 can be reduced.

Further, the adhesive agent layer 31 is formed on the entire front surface of the OLED panel 21, and no space (an air layer) is left between the OLED panel 21 and the wavelength panel 24. Accordingly, the display panel unit 20 has high transmittance of light from the OLED panel 21.

As shown in FIGS. 2 and 3, the touch panel 22 is adhered to the back surface of the front panel 2 via an adhesive film 32. The wavelength panel 24 is adhered to the back surface of the touch panel 22 via an adhesive film (not shown). Use of an adhesive film to adhere the touch panel 22 and the wavelength panel 24, as described above, can facilitate the manufacturing process of the display panel unit 20. Since these two adhesive films have a size corresponding to that of the wavelength panel 24 and that of the touch panel 22, no space (an air layer) is left between any members disposed on the front side of the OLED panel 21. With the above, the display panel unit 20 can have high transmittance of light from the OLED panel 21.

In the electronic device 1, members positioned more forward than the OLED panel 21, namely, the base member of the touch panel 22, the wavelength panel 24, and the front panel 2, described above, are all made of resin. Accordingly, the electronic device 1 can have high shock resistance for the OLED panel 21.

As shown in FIGS. 2 and 3, the display panel unit 20 has a frame 23 that is a metal panel provided in order to ensure strength of the display panel unit 20. The frame 23 is fixed to the back surface of the OLED panel 21 via an adhesive film 33. A sheet like cushion 25 is provided on the back surface of the frame 23. The cushion 25 is made of elastic member, such as elastomer, or the like, having elasticity in the thickness direction. The cushion 25 as well is adhered to the back surface of the frame 23 via an adhesive film (not shown). Further, metal leaf 26 (e.g., copper leaf) is disposed on the back surface of the cushion 25. The metal leaf 26 shields noise relative to other electronic components (e.g., an antenna) of the electronic device 1.

As shown in FIG. 3, the electronic device 1 includes a housing 50 for accommodating various electronic components of the electronic device 1. The housing 50 in this example has a back housing 52 for covering the back surface of the circuit board 41 of the electronic device 1 and a front housing 51 to be assembled into the back housing 52 in the front-back direction so as to cover the front surface of the circuit board 41. The front panel 2 is disposed on the front side of the front housing 51, and mounted on the front housing 51, as to be described later in detail.

An accommodating recess 51e having a size corresponding to the thickness of the display panel unit 20 is formed on the front housing 51. The display panel unit 20 is accommodated in the accommodating recess 51e. The depth of the accommodating recess 51e corresponds to the thickness of the display panel unit 20, and the display panel unit 20 is supported by the base surface of the accommodating recess 51e. That is, the display panel unit 20 is sandwiched by the accommodating recess 51e and the front panel 2. This can improve resistance of the front panel 2 and the display panel unit 20 against an external force applied to the surface of the front panel 2. That is, even when an external force is applied to the surface of the front panel 2, the front panel 2 is less likely dented, and accordingly, the adhesive structure between the members constituting the display panel unit 20 can be prevented from being damaged.

The front panel 2 is larger than the OLED panel 21 and the touch panel 22, as shown in FIGS. 1 and 2, and has an outer circumferential portion (indicated by 2d, 2e in FIGS. 1 and 2) that is positioned more outward than the outer edge of the panels 21, 22. The front panel 2 is disposed on the front side of the front housing 51, and the outer circumferential portion of the front panel 2 is adhered to the front housing 51 via an adhesive film. In this example, the entire outer circumferential portion is adhered to the front housing 51. This structure can correct the warp of the front panel 2, and accordingly can reduce a lord applied to the OLED panel 21.

The OLED panel 21 and the touch panel 22 in this example are rectangular, of which left-right width is larger than the up-down width thereof. The front panel 2 as well has a left-right width larger than the up-down width thereof. The outer circumferential portion of the front panel 2 includes two first spread portions 2d that spread from the outer edge of the panels 21, 22 upward and downward, respectively, and two second spread portions 2e that spread from the outer edge of the panels 21, 22 leftward and rightward, respectively. The second spread portion 2e spreads more largely than the first spread portion 2d does. That is, the width W2 of the second spread portion 2e in the left-right direction is larger than the width W1 of the first spread portion 2d in the up-down direction (see FIG. 1). As described above, since the spread portion 2e spreading largely in the left-right direction is provided to the front panel 2, the warp of the front panel 2 can be readily corrected, and resistance against an external force applied to the surface of the front panel 2 can be increased. The front panel 2 is made of light transmissive resin, as described above. Non-light transmissive coloring agent is applied to the second spread portions 2e and the first spread portions 2d.

As described above, the operating button 5 and the operating stick 7 are disposed to the right of the display panel unit 20. The directional key 6 and the operating stick 8 are disposed to the left of the display panel unit 20. These operating members 5, 6, 7, 8, of which base portions are held by the front housing 51, project forward from the electronic device 1. The second spread portions 2e spread rightward or leftward beyond the positions of the operating members 5, 6, 7, 8. The second spread portions 2e have holes 2f formed thereon in which the operating members 5, 6, 7, 8 are arranged. This structure can ensure a sufficient width of the second spread portion 2e. Consequently, the warp of the front panel 2 can be more readily corrected, and the resistance against an external force applied to the surface of the front panel 2 can be further increased.

In this example, the opening 2f has a shape defined by two connected round holes 2g, 2h. In the second spread portion 2e on the right side, plural operating buttons 5 and the operating stick 7 are arranged in the two round holes 2g, 2h, respectively. The sizes of the two holes 2g, 2h correspond to those of plural buttons 5 and the operating stick 7, respectively. That is, the opening 2h, where the operating stick 7 is disposed, is smaller than the opening 2g. Accordingly, in the second spread portion 2e, a larger area can be ensured for adhering to the front housing 51. Similarly, in the second spread portion 2e on the left side, the directional key 6 and the operating stick 8 are disposed in the two holes 2g, 2h, respectively. The sizes of the two holes 2g, 2h correspond to those of the directional key 6 and the operating stick 8, respectively. That is, the opening 2h, where the operating stick 8 is disposed, is smaller than the opening 2g. Further, holes 2i are formed on the second spread portion 2e for the buttons 16a, 16b, 16c to be disposed therein (see FIG. 2).

As shown in FIG. 3, a projecting portion 51a to be fit inside the opening 2f is formed on the front housing 51. An opening 51b is formed on the projecting portion 51a, and the operating members 5, 6, 7, 8 are disposed in the opening 51b. The outer shape of the projecting portion 51a corresponds to the inner shape of the opening 2f. A flange 51c is formed on the outer circumferential edge of the front housing 51, surrounding the outer circumferential edge of the front panel 2. The front panel 2 is fit inside the flange 51c. The position of the front panel 2 relative to the front housing 51 is accurately defined by the flange 51c and the projecting portion 51a. As a result, the relative position between an adhesive film for adhering the front panel 2 to the front housing 51 and the front panel 2 is also accurately defined. With the above, adhesive strength of the front panel 2 relative to the front housing 51 can be ensured.

As described above, the electronic device 1 includes the resin front panel 2 disposed on the front side of the OLED panel 21 and functioning as the front surface of the electronic device 1. Further, the display panel unit 20 includes the adhesive agent layer 31 formed between the OLED panel 21 and the front panel 2. The OLED panel 21 is fixed to the front panel 2 via the adhesive agent layer 31. With this structure, since the OLED panel 21 is fixed via the adhesive agent layer 31 to the highly shock-resistive resin front panel 2, the OLED panel 21, the adhesive agent layer 31, and the front panel 2 together constitute a single shock-resistive component. Further, since the adhesive agent layer 31 can absorb a warp of the front panel 2 by providing a sufficient thickness to the adhesive agent layer 31, and accordingly, a load applied to the OLED panel 21 can be reduced.

A panel member (the wavelength panel 24 in the above description) is provided between the OLED panel 21 and the front panel 2, and the adhesive agent layer 31 is formed by applying adhesive agent to either one of the OLED panel 21 and the wavelength panel 24. With this structure, the adhesive agent layer 31 can be formed using adhesive agent having lower viscosity, compared to adhesive agent applied on both surfaces of an adhesive film. For example, since gel or liquid adhesive agent can be used as adhesive agent in forming the adhesive agent layer 31, it is possible in the process of manufacturing the display panel unit 20 to adhere the OLED panel 21 and the wavelength panel 24 to each other without application of a large pressure thereto.

The display panel unit 20 further has the touch panel 22 disposed between the OLED panel 21 and the front panel 2, and the touch panel 22 is fixed to the front panel 2 via the adhesive film 32 having adhesive agent applied on the both surfaces thereof. This structure can facilitate a work of fixing the touch panel 22 to the front panel 2.

The front panel 2 includes the first resin layer 2a and the second resin layer 2b made of material different from that of the first resin layer 2a and formed on the back surface of the first resin layer 2a. This structure can impart two incompatible functions to the front panel 2. For example, it is possible to improve shock resistance of the front panel 2, that is, to make the front panel 2 less breakable, while preventing the front panel 2 from being damaged on the surface thereof.

Further, the front panel 2 has the third resin layer 2c made of material identical to that of the first resin layer 2a and formed on the back surface of the second resin layer 2b. This structure can reduce a warp of the front panel 2.

The front panel 2 has the outer circumferential portion positioned more outward than the outer edge of the OLED panel 21, and the outer circumferential portion of the front panel 2 is adhered to the housing 50. This structure can correct the warp of the front panel 2, and further reduce a load applied to the OLED panel 21.

The front panel 2 has a width W2 in the left-right direction larger than the width W1 thereof in the up-down direction. The outer circumferential portion of the front panel 2 has first spread portions 2d that spread more in the up-down direction beyond the outer edge of the OLED panel 21 and the second spread portions 2e that spread more in the left-right direction beyond the outer edge of the OLED panel 21. The second spread portion 2e spreads more largely than the first spread portion 2d, and is adhered to the housing 50. This structure can more effectively correct the warp of the front panel 2, and can further reduce a load applied to the OLED panel 21.

The electronic device 1 further has the operating members 5, 6, 7, 8 disposed to the left and right of the OLED panel 21. The second spread portions 2e have the openings 2f formed thereon in which the operating members 5, 6, 7, 8 are disposed. This structure can readily ensure a sufficient width of the second spread portion 2e.

Note that the present invention is not limited to the electronic device 1 described above, and various modifications are possible.

For example, although it is described in the above that the display panel unit 20 has the wavelength panel 24, the wavelength panel 24 is not necessarily provided. In this case, the OLED panel 21 and the touch panel 22 may be adhered to each other via the adhesive agent layer 31.

The touch panel 22 as well may not be necessarily provided. In this case, the OLED panel 21 and the front panel 2 may be directly adhered to each other via the adhesive agent layer 31.

What is claimed is:

1. A portable electronic device, comprising:
   an organic electroluminescent display panel;
   a front panel made of resin, disposed on a front side of the organic electroluminescent display panel, and functioning as a front surface of the electronic device, where the front panel includes a first resin layer and a second resin layer made of material different from that of the first resin layer and formed on a back surface of the first resin layer, and where the second resin is made of material that is less hard than the first resin layer; and
   at least one panel disposed between the organic electroluminescent display panel and the front panel, wherein:
   the at least one panel is fixed to the front panel via an adhesive film having adhesive agent applied on both surfaces thereof,
   the organic electroluminescent display panel is fixed to the at least one panel via an adhesive agent layer which is a layer made of adhesive agent applied on the organic electroluminescent display panel or the at least one panel.

2. The portable electronic device according to claim 1, wherein:
   the at least one panel includes a touch panel and another panel attached on the touch panel,
   the touch panel is fixed to the front panel via the an adhesive film, and
   the organic electroluminescent display panel is fixed to the another panel via the adhesive agent layer.

3. The portable electronic device according to claim 1, wherein the first resin layer include acryl and the second resin layer includes polycarbonate.

4. The portable electronic device according to claim 1, wherein the front panel further includes a third resin layer made of material identical to that of the first resin layer and formed on a back surface of the second resin layer.

5. The portable electronic device according to claim 1, further comprising a housing, wherein
   the front panel includes an outer circumferential portion positioned more outward than an outer edge of the organic electroluminescent display panel, and
   the outer circumferential portion of the front panel is adhered to the housing.

6. The portable electronic device according to claim 5, wherein
   the front panel has a width in a left-right direction larger than a width thereof in an up-down direction,
   the outer circumferential portion of the front panel has a first spread portion spreading in the up-down direction beyond the outer edge of the organic electroluminescent display panel and a second spread portion spreading in the left-right direction beyond the outer edge of the organic electroluminescent display panel, and
   the second spread portion spreads more largely than the first spread portion, and is adhered to the housing.

7. The portable electronic device according to claim 6, further comprising operating members provided to left and right of the organic electroluminescent display panel, respectively, wherein the second spread portion has an opening formed thereon in which the operating member is disposed.

* * * * *